Feb. 17, 1925.
G. GRONNER
ATTACHMENT FOR DEPTH GAUGES
Filed March 22, 1922
1,526,418
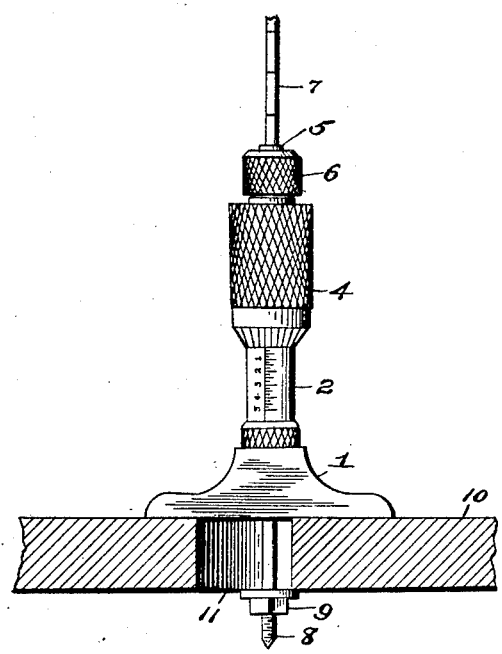
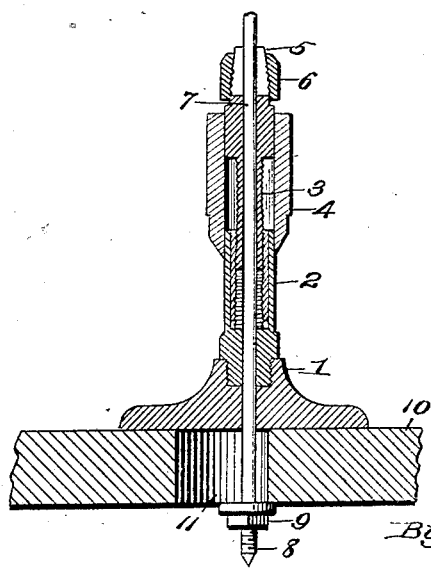
INVENTOR.
George Gronner Patented Feb. 17, 1925.

1,526,418

UNITED STATES PATENT OFFICE.

GEORGE GRONNER, OF DAVENPORT, IOWA.

ATTACHMENT FOR DEPTH GAUGES.

Application filed March 22, 1922. Serial No. 545,853.

(GRANTED UNDER THE ACT OF MARCH 3, 1883; 22 STAT. L. 625.)

*To all whom it may concern:*

Be known that I, GEORGE GRONNER, a citizen of the United States, and a resident of Davenport, county of Scott, and State of Iowa, have invented an Improvement in Attachments for Depth Gauges, of which the following is a specification.

The invention described herein may be used by the Government, or any of its officers or employees in prosecution of work for the Government, or by any other person in the United States, without payment to me of any royalty thereon.

The subject of this invention is an attachment for depth gauge.

It is often found necessary to measure the thickness of a bed plate or other structure where it is impossible to secure the measurement from the edge of the plate or structure or where the thickness at the position of the bolt hole or other opening is desired.

The attachment which I have devised for a depth gauge permits a ready determination of the dimension required.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

One practical embodiment of the invention is shown in the accompanying drawing, wherein:

Fig. 1 is a view in elevation of a well known form of depth gauge equipped with my attachment;

Fig. 2 is a view in longitudinal section of the same.

Referring to the drawings by numerals of reference:

1 indicates the base of the usual form of depth gauge supporting a hollow graduated sleeve 2, which is interiorly threaded to receive a hollow threaded stem 3 having a head to which a knurled barrel 4 is rigidly secured.

The head of the stem 3 is slotted to provide a chuck 5 upon which is threaded a clamping nut 6, which may be screwed on to clamp a graduated rod 7 in place in the chuck or off to permit the movement of the rod longitudinally of the gauge through which the rod passes.

An end of the rod 7 projects beyond the bottom of the base 1 and is herein shown as threaded at 8 to receive a flange nut 9, which acts as a stop or anvil to engage the object to be measured upon the face opposite to that against which the base 1 rests.

Given a plate 10 having an aperture 11, and desiring to find the thickness of the plate at the aperture, the nut 6 is threaded off sufficiently to allow the rod 7 to move freely longitudinally of the gauge, the lower end of the rod passed through the aperture and the gauge moved to position so that the flange nut 9 engages the lower face of the plate adjacent the aperture, as shown. The rod may then be drawn up to bring the nut firmly against the plate, the screw 6 threaded on and the reading taken from the graduations on the rod. Should a finer reading to fractional portions of the graduations of the rod be desired the same may be obtained by setting the nearest graduation on the rod in the plane of the top surface of the chuck and rotating the barrel 4 in the usual manner to bring the nut into engagement with the face of the work and reading the graduations on the barrel and sleeve. It is, of course, understood that the zero of the scale on rod 7 registers with the top end of chuck 5 when the nut 9 rests against the bottom of base 1.

What I claim is:

1. The combination with a depth gauge having a graduated rod movable longitudinally therethrough, of an anvil affixed to an end of the rod.

2. The combination with a depth gauge having a graduated sleeve, a graduated barrel rotatable on said sleeve and a graduated rod movable through said gauge, of an anvil affixed to the lower end of the rod, the graduations on the rod providing a rough reading and the graduations on the sleeve and barrel providing more correct readings of the thickness of the article measured.

GEORGE GRONNER.